US005334432A

United States Patent [19]

Long

[11] Patent Number: 5,334,432

[45] **Date of Patent: * Aug. 2, 1994**

[54] CONTINUOUS FORM

[76] Inventor: John A. Long, 41 Lamont Avenue, Scarborough, Ontario, M1S 1A8, Canada

[ * ] Notice: The portion of the term of this patent subsequent to Jun. 15, 2010 has been disclaimed.

[21] Appl. No.: 35,702

[22] Filed: Mar. 23, 1993

Related U.S. Application Data

[63] Continuation-in-part of Ser. No. 859,879, Mar. 30, 1992, abandoned, which is a continuation-in-part of Ser. No. 816,712, Jan. 3, 1992, Pat. No. 5,275,857, which is a continuation-in-part of Ser. No. 800,285, Nov. 29, 1991, Pat. No. 5,219,631.

[51] Int. Cl.5 .............................................. B32B 3/10

[52] U.S. Cl. ...................................... 428/43; 428/136; 281/5; 462/26; 462/46

[58] Field of Search ................... 428/43, 131, 136, 156; 281/5; 462/6, 26, 46, 52

[56] References Cited

U.S. PATENT DOCUMENTS 5,219,631 6/1993 Long .................................. 428/136

*Primary Examiner*—Alexander S. Thomas

[57] ABSTRACT

A continuous form has regularly longitudinal spaced opposed pairs of transverse cuts extending from each edge of the form. The transverse cuts extending from any one edge are of uniform length. Each pair of transverse cuts is joined by a light line of perforation. A perforation or score line runs longitudinally along the inner end of the transverse cuts extending from each edge. This continuous form construction permits the form portion to be folded in the direction of motion of the form over the shortest known distance prior to cutting or separating the form at the opposed pairs of lines to form folded sheets.

5 Claims, 6 Drawing Sheets

CONTINUOUS FORM

CROSS-REFERENCE TO RELATED APPLICATIONS

This application is a continuation-in-part of application Ser. No. 859,879 filed Mar. 30, 1992 now abandoned which is a continuation-in-part of application Ser. No. 816,712 filed Jan. 3, 1992 now U.S. Pat. No. 5,275,857 which is a continuation-in-part of application Ser. No. 800,285 filed Nov. 29, 1991, now U.S. Pat. No. 5,219,631.

BACKGROUND OF THE INVENTION

1. Field of the Invention

This invention relates to a paper continuous form.

2. Description of the Related Art

Mass mailings generally rely upon apparatus to feed, cut and fold a continuous form into folded letter sheets for stuffing in an envelope. The continuous form is typically provided in a paper web having pin hole edges for tractor feeding of the web. Furthermore, the web may be perforated across its width at uniform intervals; in such case, the paper web is often referred to as "computer paper". One method of handling a paper web (with or without the noted transverse perforations) is as follows. The paper web is tractor fed to a separating station (if the web is transversely perforated) or a cutting station (if the web is not transversely perforated) and the separate sheets are then conveyed to a folding station whereat automatic arms first fold one marginal portion of the sheet over a medial portion of the sheet and then fold the remaining marginal portion of the sheet over the first mentioned marginal portion and the medial portion of the sheet. This results in a folded letter which has a standard letter fold. One drawback with this method is that once the individual sheets have been cut or separated from the continuous form it is difficult to keep them in registration in order to make the letter folds properly. Furthermore, once cut or separated, the sheets are generally supported underneath which makes a Z-fold for the sheets problematic. By way of explanation, a Z-fold results when one marginal portion of the sheet is folded over the medial portion of the sheet and the other marginal portion of the sheet is folded under the medial portion of the sheet. A Z-fold has an advantage in mass produced letters in that the address at the head of the letter may be on the outside of the letter so that it may appear under a window in an envelope into which the letter is stuffed.

A second method of forming folded letters from the aforenoted paper web involves tractor feeding the web and then buckle folding the leading portion of the web subsequent to which the leading portion is severed from the web resulting in a folded letter sheet. One drawback with this approach is that it cannot be used where inserts have been adhered to the web ahead of the buckle folding station if such inserts are of significant thickness. Thus, for example, this method cannot be used where standard thickness credit cards (which are about 30 thousandth's of an inch in thickness) are attached to each sheet in the continuous form since the continuous form will then jam in the buckle folding rollers.

While not known to be used in the mass production of letter sheets, it is known to progressively fold webs along their length with edge guides which progressively urge a marginal portion of the web towards the center of the web. If this method were employed in the folding of the aforenoted paper web of computer paper (which typically has a width of about 9½ inches), it would require about an eight-foot run to complete a fold of a marginal portion of the web over the medial portion of the web without ripping the paper or causing it to separate at any transverse perforations. Space is generally extremely limited in mail rooms. This method would, therefore, be unsuitable in many mass mailing applications due to the large area that would be taken up by such machinery.

Accordingly, there remains a need for a continuous form more suitable for use in the mass production of letters.

SUMMARY OF THE INVENTION

Accordingly to the present invention, there is provided a paper continuous form, comprising: a plurality of opposed pairs of linear transverse cuts, one cut of each opposed pair extending in said continuous form from one margin of said continuous form and the other cut of each opposed pair extending in said continuous form from the other margin of said continuous form, all transverse cuts of said plurality of opposed pairs of transverse cuts which extend from a given one of said one margin and said other margin being of uniform length; a light line of perforation joining each opposed pair of transverse cuts; each transverse cut being at least several times longer than any cut forming part of said light line of perforation.

BRIEF DESCRIPTION OF THE DRAWINGS

In the figures which disclose example embodiments of the invention.

DESCRIPTION OF THE PREFERRED EMBODIMENTS

Figure 1:
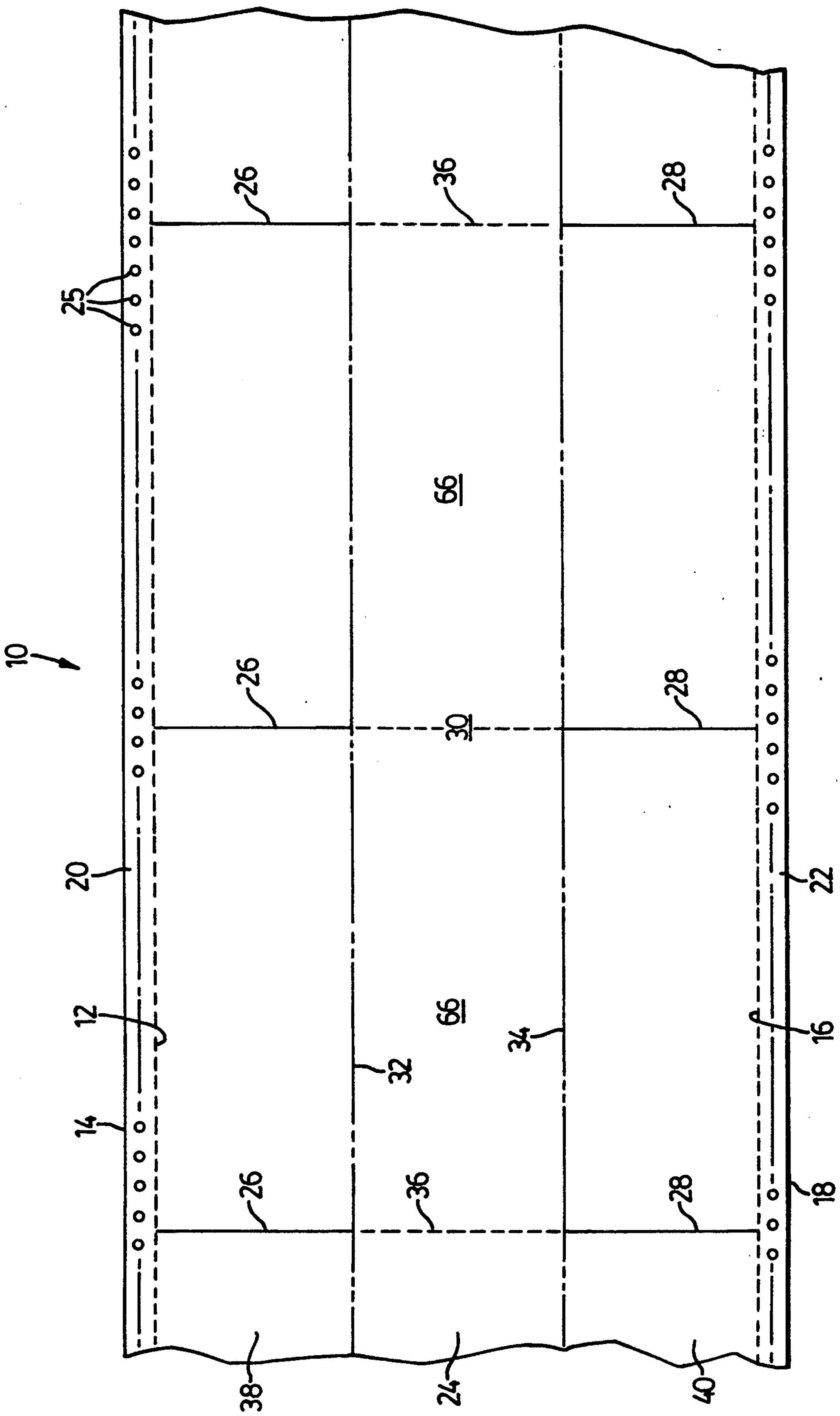
FIG. 1 is a plan view of a paper web made in accordance with this invention.

Turning to FIG. 1, a paper web 10 has a marginal longitudinal line of perforation 12 proximate one side 14 of the web and a second marginal longitudinal line of perforation 16 proximate the other side 18 of the web. These longitudinal lines of perforation delimit edge portions 20 and 22. The edge portions 20 and 22 each have longitudinal lines of pin holes 25 for tractor feeding of the web.

A continuous form portion 24 extends between the edge portions. The continuous form portion 24 of the web has opposed pairs of marginal transverse cuts 26, 28. Cuts 26 extend from the longitudinal line of perforation 12 and cuts 28 extend from the longitudinal line of perforation 16. The opposed pairs of transverse cuts leave a middle web portion 30 which is uncut but which has a line of perforation 36 extending thereacross joining each opposed pair 26, 28 of transverse cuts. The transverse cuts 26 extending from line of perforation 12 are of uniform length. Similarly, the cuts 28 extending from line of perforation 16 are of uniform length. The pairs 26, 28 of cuts are spaced uniformly along the length of the web 10. Furthermore, each cut extends approximately one-third of the width of the continuous form portion 24 of the web.

A longitudinal scored line 32 extends along the inside end of cuts 26 and, similarly, a longitudinal scored line 34 extends along the inside end of cuts 28. These scored lines form continuous form marginal portions 38 and 40 on either side of the middle portion 30.

Each segment of the continuous form portion 24 between adjacent pairs of opposed transverse cuts is a sheet precursor 66 with the short (i.e. width) dimension of the sheet precursor being in line with the direction of travel of the web.

Figure 2:
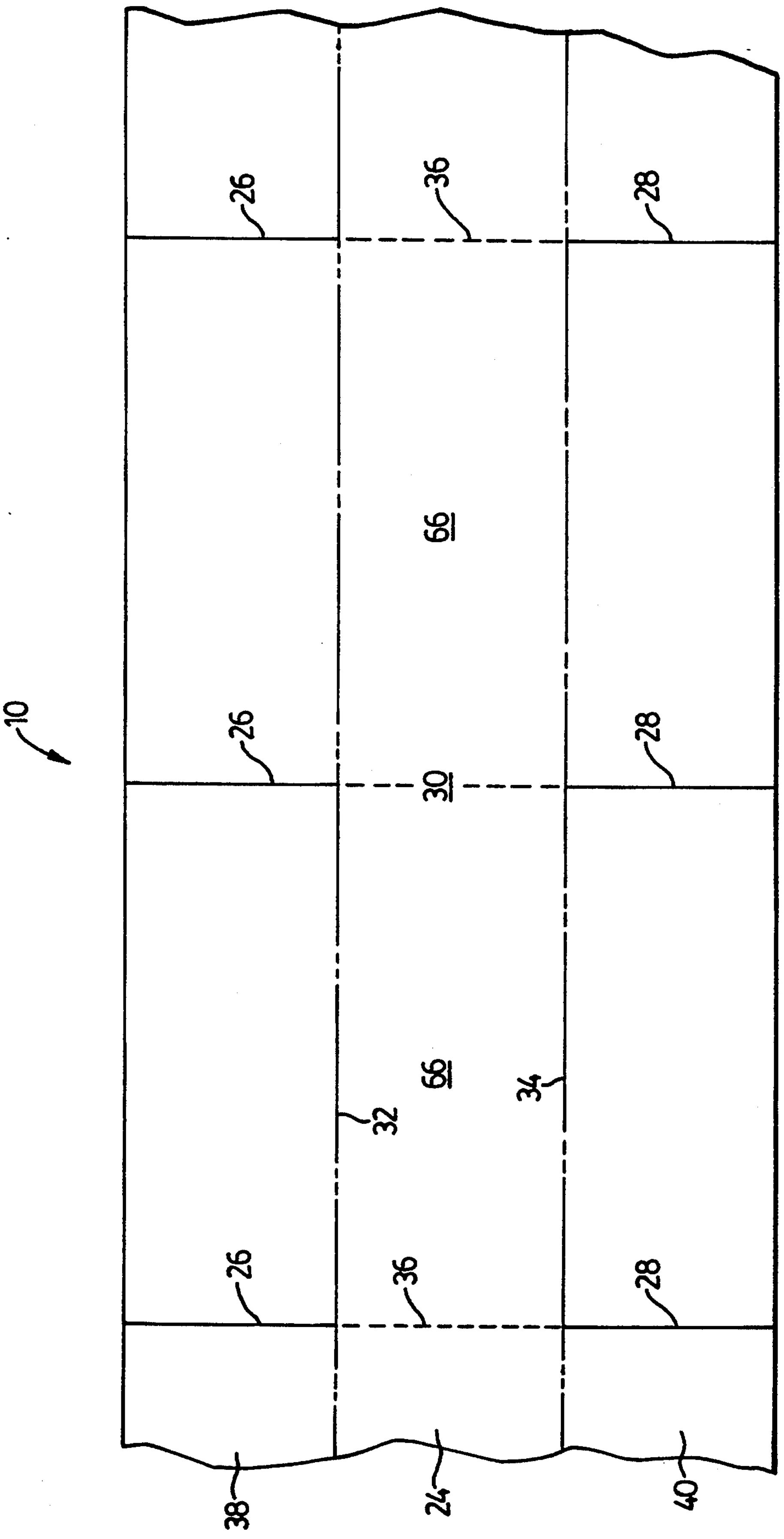
FIG. 2 is a plan view of a continuous form made in accordance with this invention.

FIG. 2 illustrates the continuous form 24 portion of the web.

Figure 3:
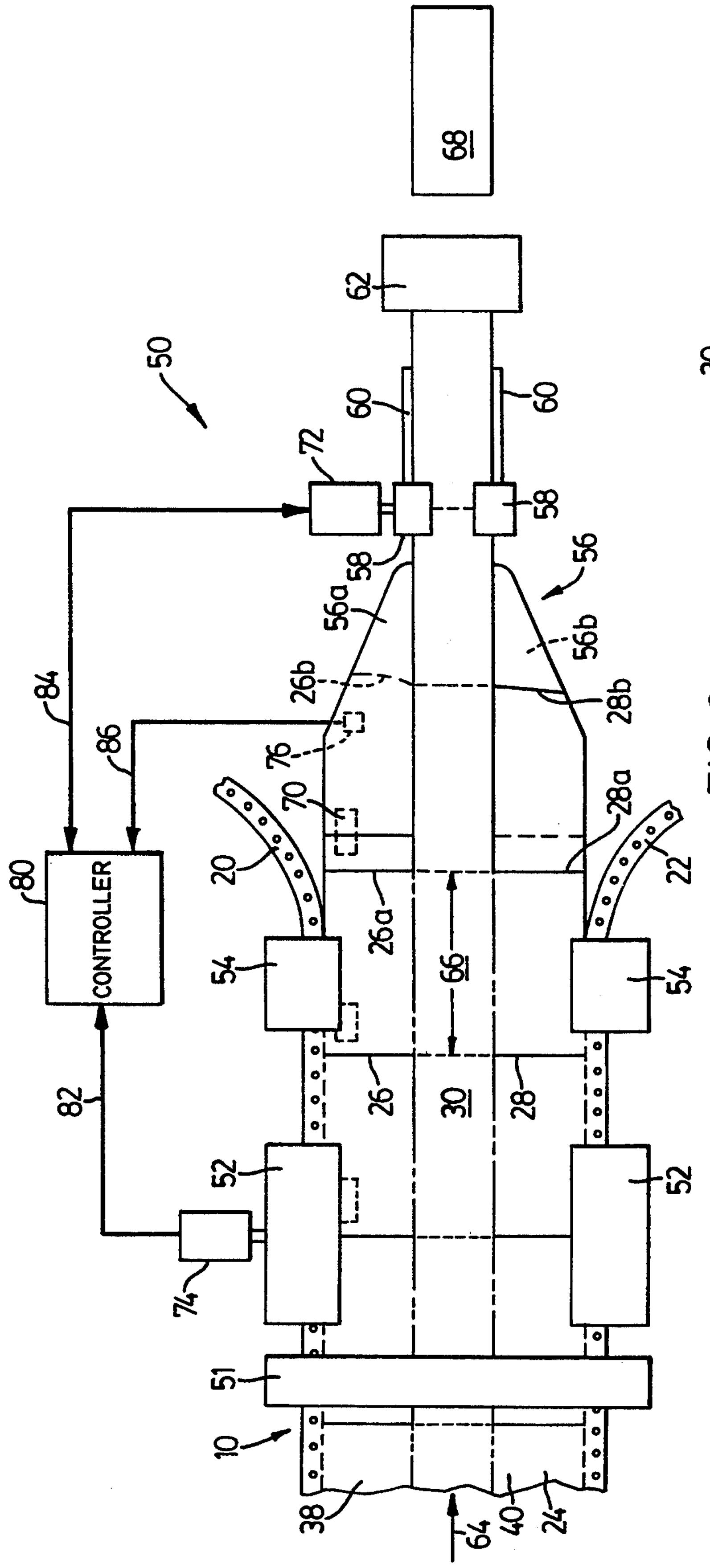
FIG. 3 shows an example machine using the paper web and continuous form of this invention, and FIG. **3*a* is a bottom perspective view of a letter sheet output from the machine of FIG. 3.

The web 10 is adapted for use with machine 50 is illustrated in FIG. 3. Referring to FIG. 3, machine 50 operates to move web 10 in a downstream direction 64 and comprises, in consecutive downstream order: a printing station 51, tractor feeders 52, edge portion separators 54, Z-folder 56 comprising folding ploughs **56*a*, 56*b*, pinch rollers 58 with associated edge guides 60, and bursting station 62**.

The ploughs **56*a* and 56*b* of Z-folder 56 have a length which is one and one half to two times that of the longitudinal spacing between adjacent pairs of opposed transverse cuts 26, 28 of web 10. Furthermore, the ploughs may commence at the output of separators 54 or, as shown, may be spaced downstream from the separators 54**.

The control system for the machine 50 comprises drive/tachometer 72 for driving pinch rollers 58 and for providing an indication of the speed of the pinch rollers, drive/tachometer 74 for driving tractor feed 52 and for providing an indication of the speed of the tractor feed, sensor 76 for sensing cuts 26, and controller 80 for receiving the output of the two encoders and the sensor on paths 82, 84, and 86 and for providing a drive control signal to the drive/tachometer 72 on path 84.

In operation of the machine 50, printing station 51 may print text on each sheet precursor 66 including an address 70 in the top left corner of each sheet precursor, which is therefore in the marginal portion 38 of the continuous form portion of the web. Tractor feeders 52 feed web 10 in the downstream direction 64 and pinch rollers 58 provide for the feeding of the web downstream of the tractor feeders 52. At edge portion separators 54, the edge portions 20 and 22 are separated off and discarded leaving the continuous form 24, as shown in FIG. 2. Downstream of separators 54, the continuous form 24 is pulled through folding ploughs **56*a*, 56*b*. Plough 56*a* acts on the marginal portion 38 of the continuous form 24 to fold it under the medial portion 30 of the continuous form and plough 56*b* acts to fold marginal portion 40 of the continuous form 24 over the medial portion of the continuous form so that the continuous form has a Z-fold. The scored lines 32, 34 of the continuous form facilitate a clean fold of each marginal portion 38, 40**, respectively.

Since ploughs **56*a*, 56*b* have a length which is one and a half to two times the distance between adjacent pairs of transverse cut lines, the Z-fold is formed without risk of tearing, kinking or otherwise mutilating the web. But the distance between adjacent pairs of transverse cuts simply defines the width of a sheet precursor 66. Accordingly, the length of the machine 50 which is required to fold a sheet precursor 66** is about twice the width of a sheet precursor. Since the width of a sheet precursor is typically 8½ inches, the length required to fold is about 17 inches.

An indication of the speed with which tractor feed 52 moves web 10 inputs controller 80 on path 82. This signal is used as a control signal for the drive 72 of pinch rollers 58 so that the pinch rollers feed the web at the same speed as the tractor feed. Accordingly, the continuous form may be kept taut at ploughs **56*a* and 56*b* by tractor feeders 52 and pinch rollers 58**.

Figure 3A:
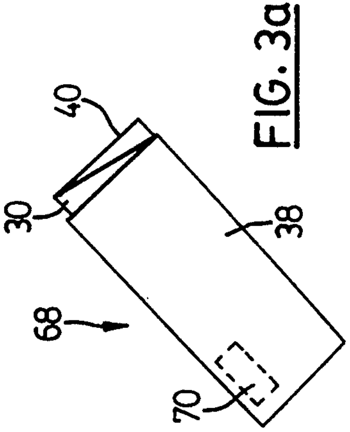

The folded continuous form 24 downstream of the ploughs **56*a*, 56*b* passes through the nip of pinch rollers 58 and is then kept in registration by edge guides 60. Pinch rollers 58 apply a positive downstream feeding tension on the continuous form. Note that it is the uncut (but perforated) middle portion 30 of the web which allows the continuous form to be pulled by the pinch rollers 58. The folded continuous form then passes to burster 62 which bursts the middle portion 30 of the continuous form across the transverse line of perforation at each opposed pair of transverse cuts to thereby form sheets 68 from the sheet precursors 66. FIG. 3*a* illustrates a folded sheet 68 in bottom perspective view. It will be apparent that the sheet 68** has been folded so that the printed address faces outwardly from the underneath of the sheet.

While it is intended that pinch rollers 58 move web 10 at the same speed as tractor feed 52, the speed at which the pinch rollers move the web may vary slightly from that of the tractor feed; this may be due to a small discrepancy in the diameter of the pinch rollers from that of their nominal diameter. Such a speed variation would be cumulative, resulting in the web becoming increasing tight until it breaks or loosing until the web misfeeds through machine 50. These problems are avoided as follows. Sensor 76 senses each transverse cut 26 as each such cut passes over the sensor. The signal from the sensor passes to the controller on path 86. Also, the speed of the pinch rollers 58 as measured by the tachometer portion of driver/tachometer 72 pass to the controller 80 on path 84. The controller is programmed with the nominal diameter of the pinch roller to which the tachometer is attached and with the dimension (width) of each sheet precursor in the downstream direction of travel of the web 10, which is a constant. Knowing the speed and nominal diameter of the pinch roller, the controller may determine the nominal distance travelled by a point on the circumference of the pinch roller between any two pulses from the sensor 76. But two consecutive signals from the sensor 76 indicate that one sheet precursor 66 has passed the sensor. Consequently, if this nominal distance is not equal to the known width of a sheet precursor, it indicates that the pinch rollers are not moving the web at an identical speed to that of the tractor feed. More particularly, if the nominal distance is less than the width of sheet precursor then the pinch rollers are moving too slowly and, conversely, if the nominal distance is greater than the width of a sheet precursor, then the pinch rollers are moving too quickly. The controller uses this feedback signal to modify the speed of the drive of drive/tachometer 72 in order to achieve synchronism between the tractor feed and the pinch rollers.

Because the machine 50 folds in the direction of movement of the web rather than transversely thereto, it will be apparent that the web may be folded even where thick inserts have been adhered to the middle portion 30 of the web 10. Furthermore, it will be noted that since the sheets 68 are burst only after folding, registration for folding is made simple since the web is held in registration by tractor feeders 52, pinch rollers 58 and edge guides 60.

Where a clean edge is required for letter sheets 68, burster 62 may be replaced with a double knife cutter which will cut the web on either side of each of the perforation lines 30.

Figure 4:
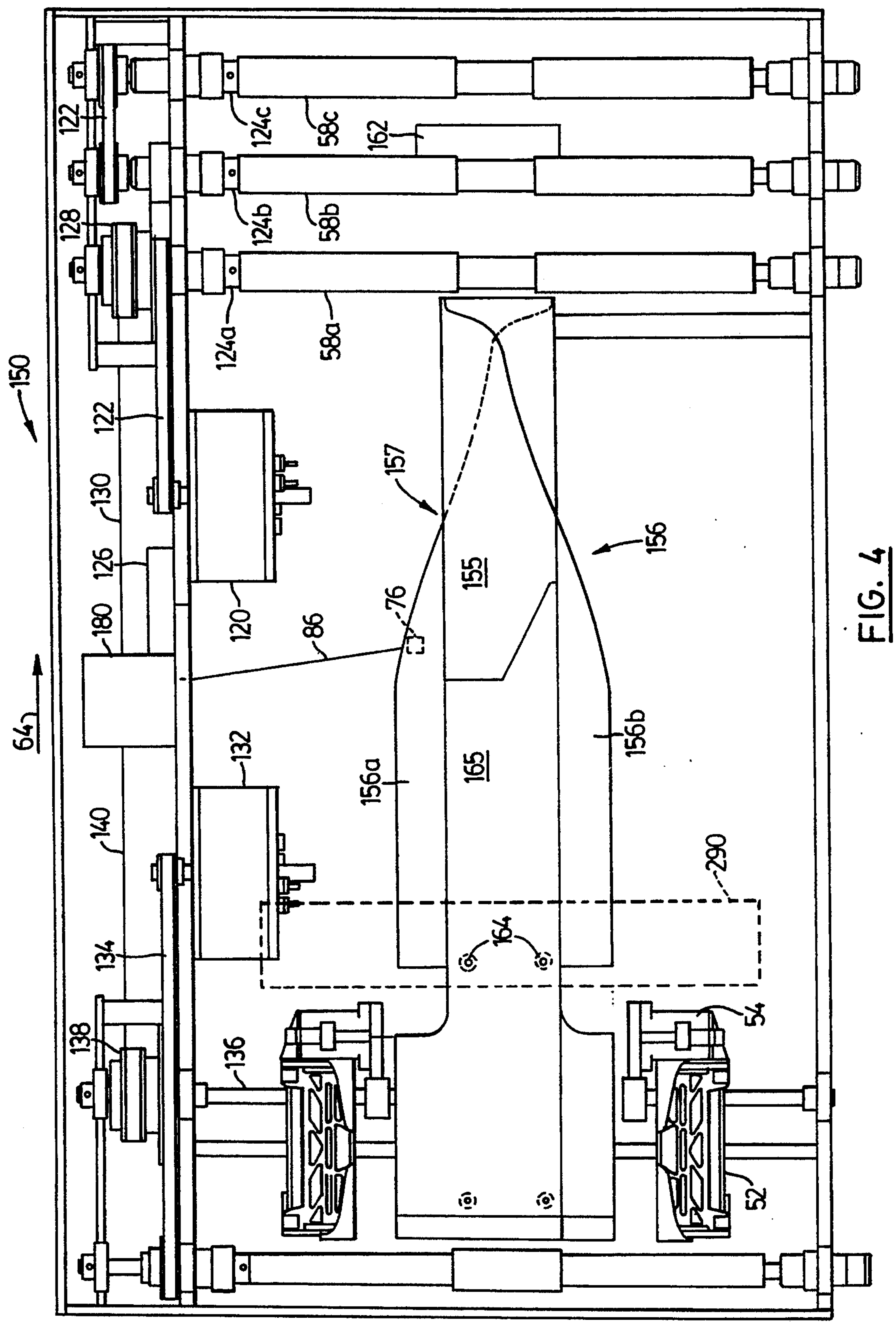
FIG. 4 is a plan view of a further embodiment of a letter forming machine made in accordance with this invention.
Figure 5:
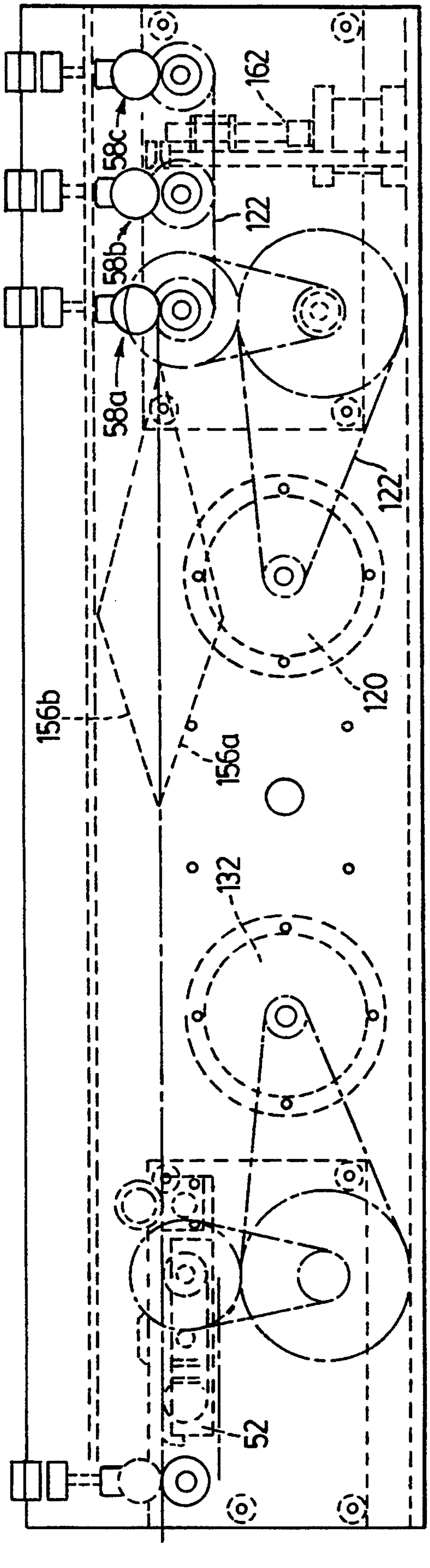
FIG. 5 is a side view of the letter forming machine of FIG. 4.
Figures 6, 7:
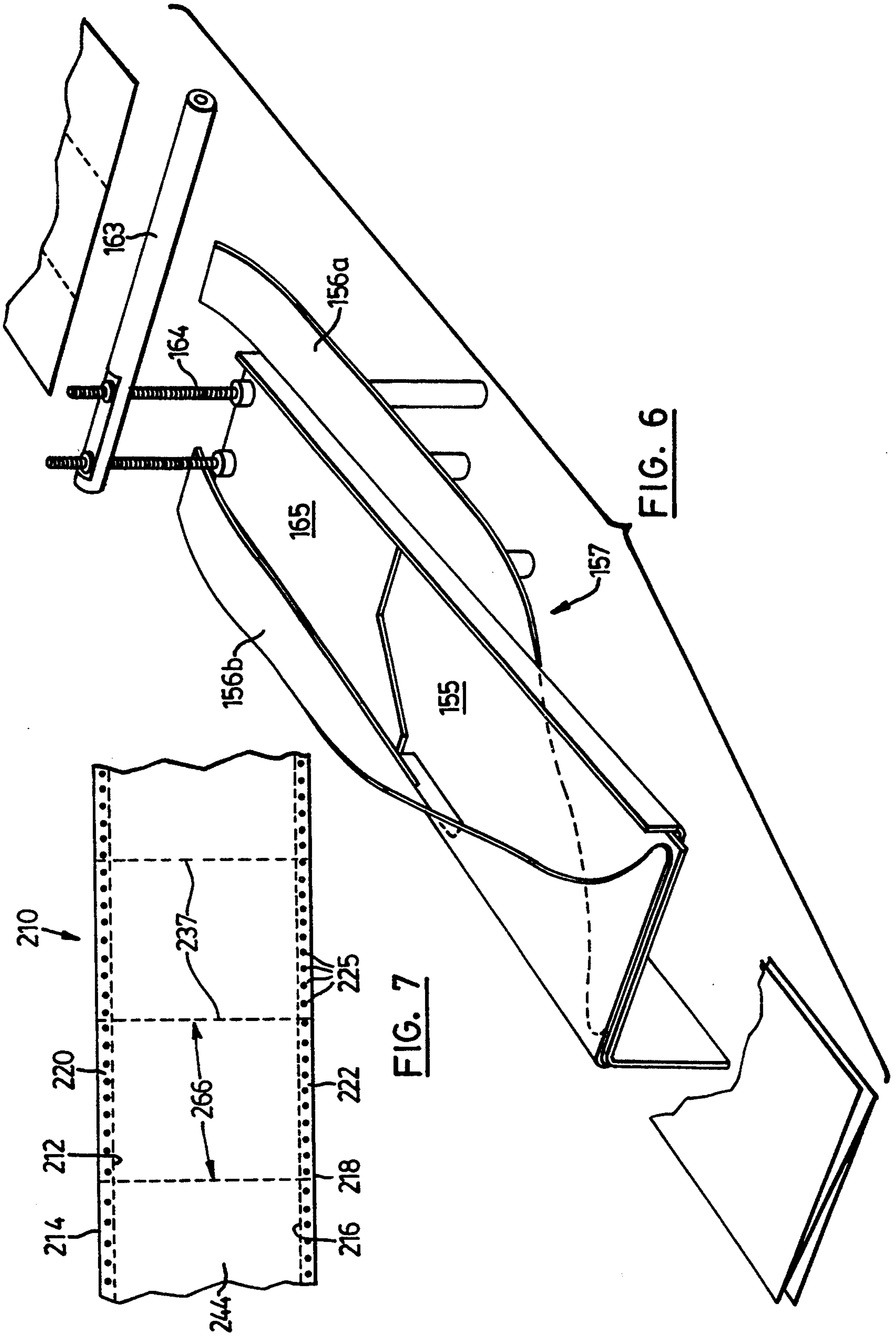
FIG. 6 is a perspective view of a portion of the machine of FIGS. 4 and 5.
FIG. 7 is a plan view of a paper web which may be used with the machine of FIG. 4**.

FIGS. 4 through 6 illustrate an alternate machine 150 for use in forming folded letter sheets from the web 10 of FIG. 1. Turning to FIGS. 4 through 6 wherein like parts have been given like reference numerals, machine 150 comprises, in consecutive downstream 64 order: tractor feed 52, separators 54 (which are illustrated as slitters), Z-folder 156, pinch roller sets 58a, 58b, double knife cutter 162, and pinch rollers 58c. The Z-folder (illustrated in perspective view in FIG. 6) comprises middle web portion guide 155 and ploughs 156a, 156b. Plough 156a is suspended by shaft 163, rods 164 and support 165 above the plane of the middle web portion guide upstream of cross-over point 157. Plough 156a folds to progressively underlie the middle web portion guide 155 downstream of the crossover point 157. The middle web portion guide 155 is formed integrally with plough 156b and plough 156b folds in the downstream direction to progressively overlie the middle web portion guide 155 beyond crossover point 157. The length of ploughs 156a and 156b over which they fold is one and a half to two times the longitudinal spacing between adjacent pairs of opposed transverse cuts 26, 28 of web 10 of FIG. 1. A drive 120 is connected by belts 122 to the drive shafts 124a, 124b, 124c of the pinch roller sets. A controller 180 supplies the control input to drive 120 on path 126. The output of rotary encoder 128 of shaft 124a inputs controller 180 on path 130. A drive 132 is connected by belts 134 to the drive shaft 136 of the tractor feed 52 and the separator 54. The output of a rotary encoder 138 on shaft 136 inputs the controller on path 140. Signals from a sensor 76 underlying plough 56a input the controller on path 86.

The operation of the machine of FIGS. 4 through 6 is similar to that of FIG. 3. More particularly, with reference to these figures as well as FIGS. 1 and 2, tractor feeders 52 feed web 10 in the downstream direction 64 and pinch rollers 58 provide for the feeding of the web downstream of the tractor feeders 52. At edge portion separators 54, the edge portions 20 and 22 are separated off and discarded leaving the continuous form portion 24 of the web. Downstream of separators 54, the continuous form 24 is pulled through folding ploughs 56a, 56b. Plough 56a acts on the marginal portion 38 of the continuous form 24 to fold it under the medial portion 30 of the continuous form and plough 56b acts to fold marginal portion 40 of the continuous form 24 over the medial portion of the continuous form so that the continuous form has a Z-fold. At the downstream end of the Z-folder 156, a portion of the web overlies the middle web portion support 155 and a portion underlies the middle web portion support; the folded web is taken up by the pinch rollers 58a. The length of the Z-folder ensures the operation of the machine does not damage the web 10 and also minimizes the length of the machine 150.

An indication of the speed with which tractor feed 52 moves web 10 inputs controller 180 on path 140. This signal is used as a control signal for the drive 120 of pinch rollers 58a, 58b, 58c so that the pinch rollers feed the web nominally at the same speed as the tractor feed. Any discrepancy in the speed of the pinch rollers is quantified by the controller 180 through the encoder signal on path 130 and the sensor signal on path 86. The discrepancy may then be hulled by adjusting the control signal for drive 120 on path 126. Accordingly, the continuous form may be kept taut at ploughs 56a and 56b by tractor feeders 52 and pinch rollers 58a, 58b. Note that it is the uncut (but perforated) middle portion 30 of the web which allows the continuous form to be pulled by the pinch rollers.

The folded continuous form then passes from pinch rollers 58b to cutter 162 which cuts the middle portion 30 of the continuous form on either side of the transverse line of perforation at each opposed pair of transverse cuts to thereby form sheets 68 from the sheet precursors 66. Of course, cutter 162 could be replaced with a rotary burster, if desired.

In a further embodiment of a machine made in accordance with this invention, a transverse cut forming station 290, shown in phantom in FIG. 4, is positioned between separators 54 and Z-folder 256. The transverse cut forming station is either a rotary burster or a rotary cutter or both a rotary cutter and a perforator, depending upon the paper web used with the machine. The machine may be input with the paper web 210 illustrated in FIG. 7 which comprises a marginal longitudinal line of perforation 212 proximate one side 214 of the web and a second marginal longitudinal line of perforation 216 proximate the other side 218 of the web. These longitudinal lines of perforation delimit edge portions 220 and 222. The edge portions 220 and 222 each have longitudinal lines of pin holes 225 for tractor feeding of the web. A continuous form portion 224 extends between the edge portions. The continuous form portion 224 of the web has transverse lines of perforation 237 spaced uniformly along the length of the web 210. Each segment of the continuous form portion 224 between adjacent lines of perforation 237 is a sheet precursor 266 with the short (i.e. width) dimension of the sheet precursor being in line with the length dimension of the web.

For use with web 210, transverse cut forming station is a burster which bursts marginal portions of each line of perforation 237 so as to form transverse cuts which extend from the marginal longitudinal line 212 and cuts which extend from the marginal longitudinal line 216 such that the cuts are of uniform length and opposed pairs of transverse cuts leave a middle web portion which is uncut. Station 290 therefore manufacturers a continuous form identical to continuous form 24 of FIG. 2 except that the longitudinal score lines 32, 34 are not present. Processing of this continuous form in the machine downstream of station 290 is identical to the processing of the continuous form downstream of separators 54 in the machine of FIG. 4 without station 290. However, the folds formed between the marginal portions of the form and the middle portion by the Z-folder may not be quite as clean due to the absence of longitudinal scored lines on the form. In this regard, it is noted that the ploughs 256a and 256b of the Z-folder have a length which is one and one half to two times that of the longitudinal spacing between adjacent perforation lines 237 of web 210.

Station 290 could be a rotary cutter and perforator in which case double knife cutter 162 would be replaced with a rotary burster. The rotary cutter and perforator at station 290 would cut opposed pairs of transverse cuts in the marginal portions of the web and perforate the middle portion of the web and the rotary burster would burst the perforated middle portion of the folded web to form the folded letter sheets.

Other modifications will be apparent to those skilled in the art and, accordingly, the invention is defined in the claims.

What is claimed is:

1. A paper continuous form, comprising:

a plurality of opposed pairs of linear transverse cuts, one cut of each opposed pair extending in said continuous form from one margin of said continuous form and the other cut of each opposed pair extending in said continuous form from the other margin of said continuous form, all transverse cuts of said plurality of opposed pairs of transverse cuts which extend from a given one of said one margin and said other margin being of uniform length;

a light line of perforation joining each opposed pair of transverse cuts;

each transverse cut being at least several times longer than any cut forming part of said light line of perforation.

2. The paper web of claim 1 further comprising a longitudinal scored or perforated line extending along the inside end of all of the transverse cuts of said plurality of said opposed pairs of transverse cuts which extend from said one margin of said continuous form and a longitudinal scored or perforated line extending along the inside end of all of the transverse cuts of said plurality of said opposed pairs of transverse cuts which extend from said other margin of said continuous form.

3. The paper web of claim 2 wherein said plurality of opposed pairs of transverse cuts are uniformly longitudinally spaced along said web.

4. The paper web of claim 3 wherein each of said transverse cuts extend approximately one-third of the width of said continuous form.

5. The paper web of claim 1 wherein each of said transverse cuts extend approximately one-third of the width of said continuous form.

* * * * *